United States Patent
Johnsman et al.

(10) Patent No.: US 6,857,647 B2
(45) Date of Patent: Feb. 22, 2005

(54) VEHICLE SUSPENSION SYSTEM

(75) Inventors: Daniel W. Johnsman, Van Wert, OH (US); James J. Korson, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 178 days.

(21) Appl. No.: 10/282,563

(22) Filed: Oct. 29, 2002

(65) Prior Publication Data

US 2004/0080136 A1 Apr. 29, 2004

(51) Int. Cl.$^7$ .............................. B60G 11/46; B60G 9/02
(52) U.S. Cl. ...................... 280/124.163; 280/124.157; 280/124.133; 280/124.176; 280/124.107; 267/31
(58) Field of Search ........................... 267/31, 41, 260, 267/241; 280/124.163, 124.157, 124.162, 124.128, 124.131, 124.116, 124.133, 124.17, 124.176, 683, 124.107, 124.106, 124.153; B60G 11/46, 9/02

(56) References Cited

U.S. PATENT DOCUMENTS

| | | | | |
|---|---|---|---|---|
| 3,482,854 A | * | 12/1969 | Masser | 280/86.75 |
| 3,785,673 A | * | 1/1974 | Harbers et al. | 280/124.101 |
| 4,273,357 A | * | 6/1981 | Pashkow | 280/124.116 |
| 4,371,190 A | * | 2/1983 | Vandenberg | 280/124.116 |
| 5,039,124 A | * | 8/1991 | Widmer | 280/124.116 |
| 5,362,095 A | * | 11/1994 | Eveley | 280/86.75 |
| 6,272,809 B1 | * | 8/2001 | Wycech | 52/731.6 |

FOREIGN PATENT DOCUMENTS

| JP | 10-166825 A | * | 6/1998 |
|---|---|---|---|
| JP | 11-48731 A | * | 2/1999 |

* cited by examiner

*Primary Examiner*—Ruth Ilan
(74) *Attorney, Agent, or Firm*—Jeffrey P. Calfa; Dennis Kelly Sullivan; Susan L. Lukasik

(57) ABSTRACT

An air spring suspension for a rear axle of truck is stabilized using a trailing link constructed from a hollow, rectangular tube. The air spring is positioned between a portion of the trailing link extending beyond the rear axle and turning inwardly on the vehicle and the frame rails of the truck's chassis. An auxiliary spring is provided by a half leaf mounting beneath the trailing link. The suspension can provide cornering stabilization by providing a connecting link between the ends of the trailing links.

14 Claims, 5 Drawing Sheets

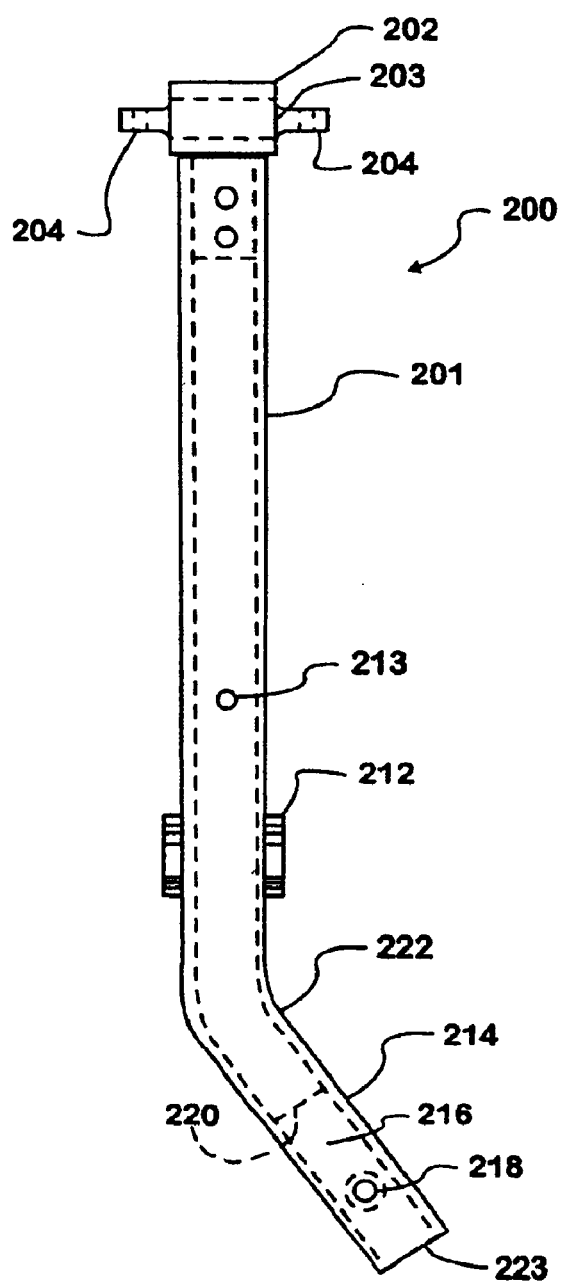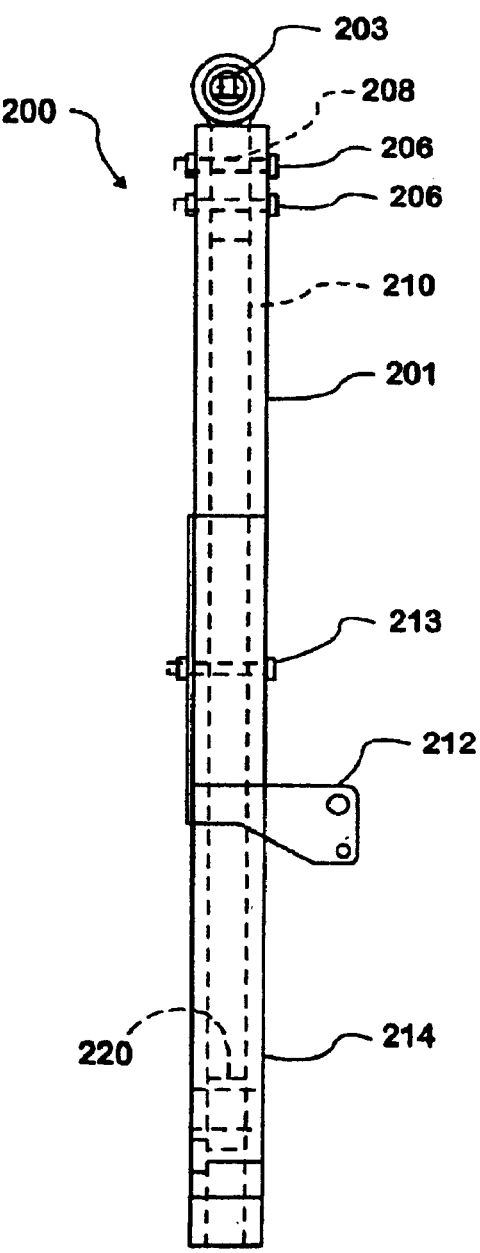
FIG. 4A   FIG. 4B

VEHICLE SUSPENSION SYSTEM

BACKGROUND OF THE INVENTION

1. Field of the Invention

The present invention relates to vehicle suspension systems and more particularly to axle stabilizing systems.

2. Description of the Problem

Truck suspension systems provide isolation of passengers and cargo from road shock while keeping the vehicle stable and preserving operator control. These objectives are met using combinations of springs, motion damping devices and auxiliary axle positioning elements. Achieving acceptable levels of performance, while supporting the vehicle's weight over a wide range of vehicle load conditions, is preferably achieved with a mechanically simple, compact and light weight suspension system.

The central element of any suspension system is the spring, and the four most popular, basic types of suspension systems used on trucks are categorized by the spring used, i.e.: leaf spring systems; equalizing beam systems; torsion bar systems; and air spring systems. Hybrid combinations of these are also used.

Air spring based systems have recently gained in popularity and have been applied to both steering and non-steering axles as well as driven and undriven axles. In an air spring based system, air bellows are positioned with respect to an axle and a vehicle frame to support the frame from the axle. Air spring suspensions give excellent load and vibration isolation by eliminating the interleaf friction found in traditional multiple leaf spring designs and, in some systems, by allowing active control of the spring rate. In addition, an air spring usually has a lower deflection rate than a leaf spring exerting the same force, giving the system greater capacity for absorbing shocks for a given displacement between the axle and the frame. Air spring pressure can be adjusted to compensate for vehicle load changes by adding air to or exhausting air from the spring. This aspect of the springs also benefits other suspension design objects, since by adding or exhausting air the vehicle height need not vary with load or positioning of the load.

A drawback of non-hybrid air spring suspension systems, especially when compared with leaf spring systems, is that they require more auxiliary stabilization to maintain the proper location and attitude of the axle with respect to the vehicle and to prevent excessive vehicle roll. Absent stabilization, air springs will extend to their maximum lengths or widths in the direction of least resistance and can cause an unevenly loaded vehicle to fall over to one side, while full leaf springs, because of twin points of connection to the vehicle frame both fore and aft of the axle, are partially self-stabilizing and provide better directed support.

Auxiliary stabilization may be directed to controlling one or more specific types of undesired movement of a vehicle or axle. To some extent, the control of one type of movement may be more readily accomplished by trading off control of another type of movement. Some auxiliary stabilizing elements can even promote certain types of undesired vehicle body or axle movement while achieving control of some other movement. Among the problems to be controlled are vehicle roll occurring during cornering, suspension expansion adjacent a driven axle on acceleration (acceleration lift), and lateral deflection of the axle, particularly during turning. Some auxiliary stabilizing systems produce axle caster changes with vertical motion of an axle.

Countering some or all of these problems is preferably obtained using auxiliary components which are not excessively complex, bulky or heavy, and which allow the full capacity of the air springs to be utilized. It would be further advantageous if the auxiliary elements provided a base for positioning an air spring.

SUMMARY OF THE INVENTION

According to the invention there is provided a suspension for a vehicle from an axle, the vehicle having left and right side frame rails. The suspension comprises left and right side hangers depending from the left and right side frame rails forward of the axle. Left and right side trailing links depend from the left and right side hangers, respectively, with the trailing links being coupled to opposite ends of the axle and extending behind the axle where the left and right side trailing links have canted portions which are turned inward on one another in a plane to support an air spring. Left and right side couplings attach opposite ends of the axle to the left and right side trailing links. The left and right side trailing links are formed from hollow tubes with each trailing link having a filler insert within the hollow tube at the coupling between the trailing link and axle. Left and right side auxiliary leaf springs are located below the left and right side trailing links between the hangers and the axle to help support the load. The main load supporting air springs are located between the turned in portions of the trailing links and the left and right side frame rails. The turned in portion may be substantially formed by a sway bar positioned connecting the left and right side trailing links.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 4A and 4B are a top plan and side elevation of a possible configuration for a trailing member.

DETAILED DESCRIPTION OF THE INVENTION

Figure 1:
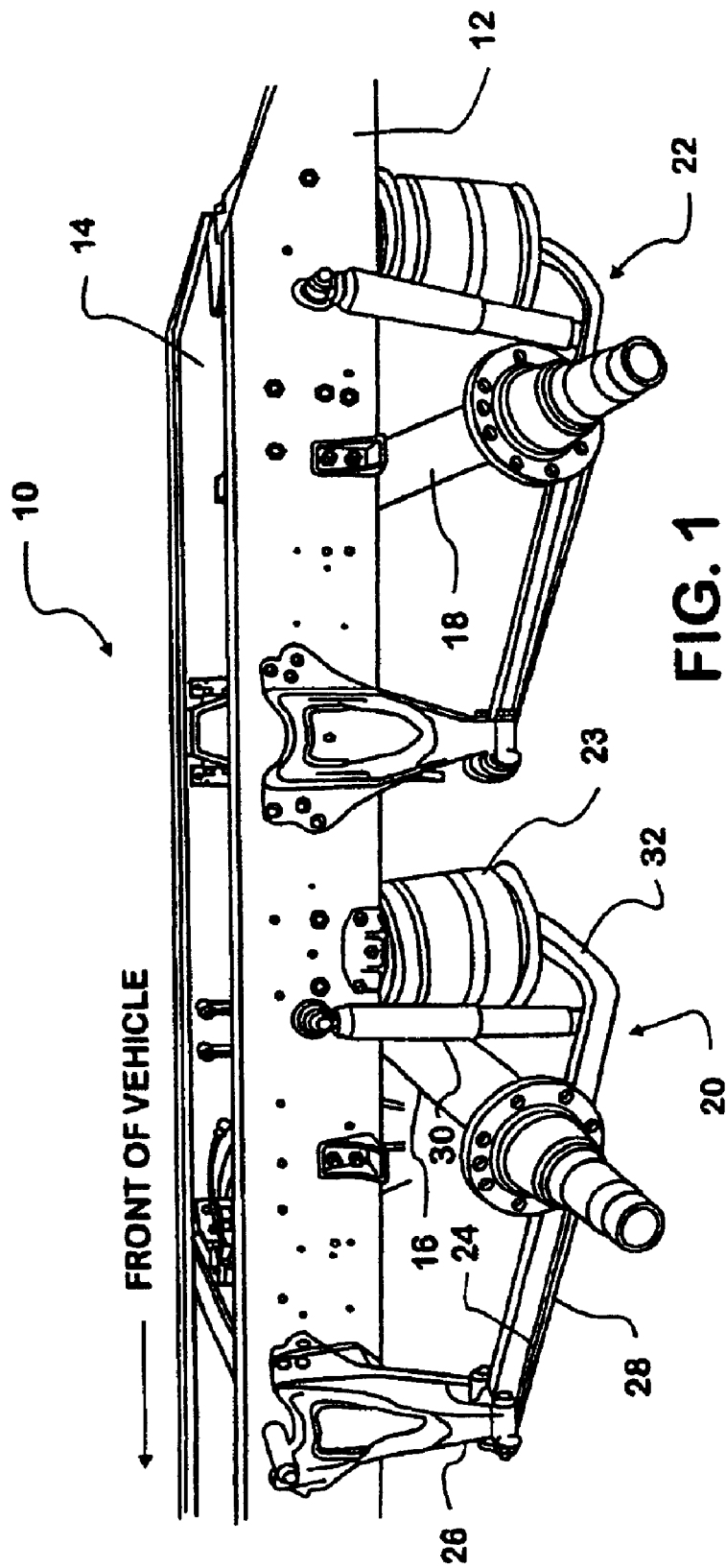
FIG. 1 is a side elevation of a portion of a tandem axle truck chassis.

Referring now to the drawings and in particular to FIG. 1, a section of a truck chassis 10, representing the sprung load of a vehicle, is illustrated. Chassis 10 has left and right side frame rails 12 and 14 running lengthwise down opposite sides of the vehicle. Frame rails 12 and 14 are supported from rear drive axles 16 and 18 by suspension systems 20 and 22, the left side portions of which are visible in the drawing. The right side sections of the suspension are mirror images of the left side sections. The suspension systems can be substantially described with reference to one side of one of the suspension systems, here suspension 20.

The left side of suspension 20 has a primary load bearing element, here an air spring 23. Air spring 23 rides on a turned in portion 32 of a trailing link assembly 24 located aft from axle 16. Trailing link assembly 24 is suspended at its lead end from a hanger 26 which is welded to left side frame rail 12 ahead of axle 16. Trailing link assembly 24 runs under axle 16 and extends behind the axle turning inwardly, that is toward the longitudinal center line of the vehicle to form turned in portion 32. A shock absorber 30 is also coupled between the trailing link assembly 24 and left side frame rail 12 by suitable pivoting connectors. An auxiliary leaf spring 28 is located below trailing link assembly 24 running between hanger 26 and axle 16. One end of leaf spring 28 is wrapped outside of trailing link assembly 24 on a bolt (not shown) framed in hanger 26. Couplings between the axles and suspension assemblies have been deleted for ease of illustration.

Figure 2:
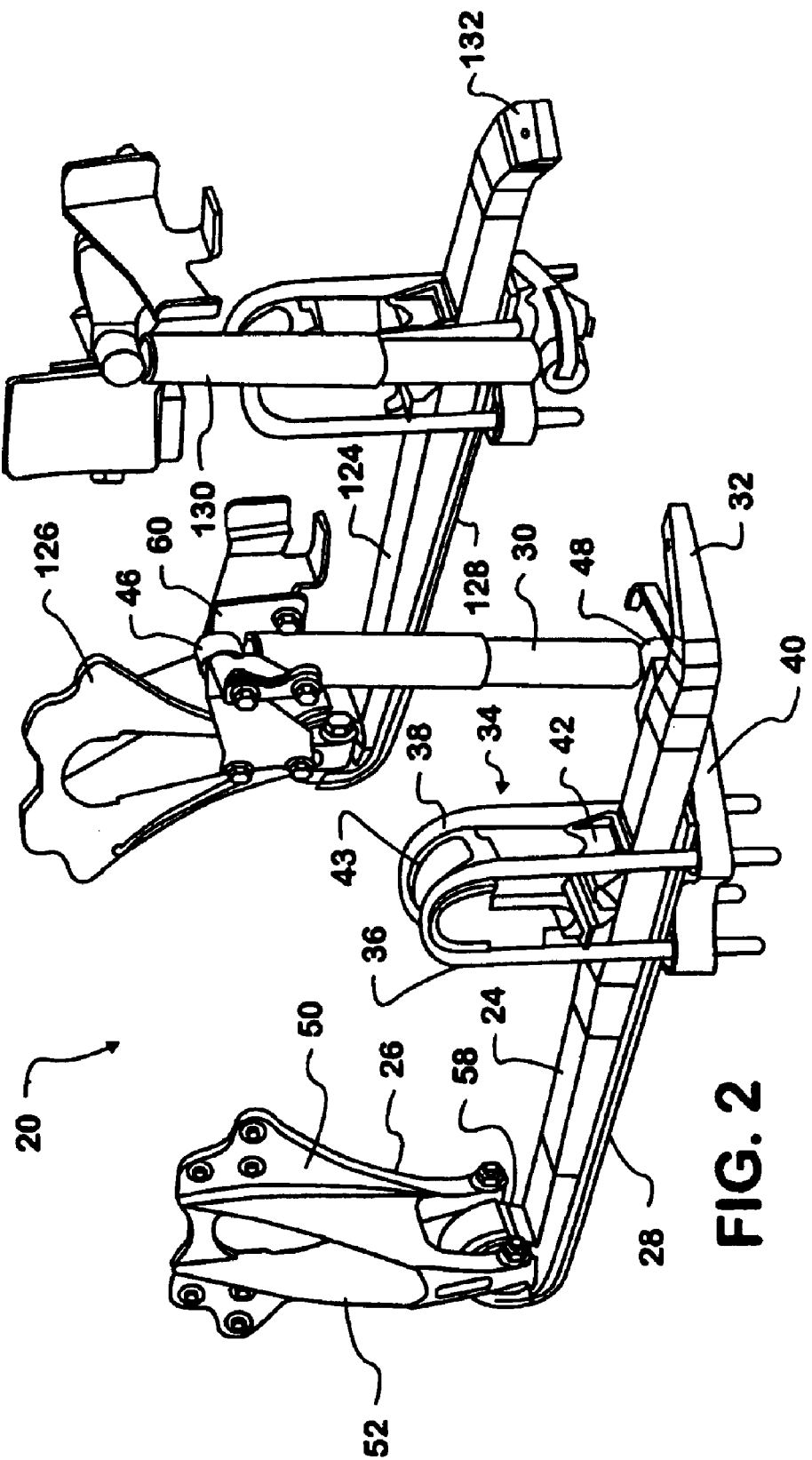
FIG. 2 is a perspective view of the novel suspension.

Referring now to FIG. 2, a perspective view of a suspension system 20 illustrates both left and right side components of the suspension, the left side components being viewed from the outside and the right side components being viewed from the inside. Left side and right side trailing link assemblies 24 and 124 are steel fabricated tubes typically having a rectangular cross sectional shape. Other cross sectional shapes are possible including elliptical and circular. The dimensions of the tube may or may not vary along the length of the tube. Trailing link assemblies 24 and 124 depend at one end from hangers 26 and 126, respectively. Link 24 terminates at one end in a loop 58 which is wrapped around a bolt fixed in hanger 26 between sections 50 and 52. Hanger sections 50 and 52 are stampings welded, formed, bolted, or riveted together to complete hanger 26. A half leaf spring 28 is located directly under trailing link 24 between hanger 26 and coupling 34. Leaf spring 28 wraps on loop 58 at one end and terminates under link 24 at its opposite end just outside of coupling 34 relative to the hanger 26. The hanger assembly may be attached by other means such as bolting or riveting.

Turned in sections 32 and 132 are an extension of the fabricated steel tube. Trailing link 24 and half leaf spring 28 are coupled to an axle using coupling 34. Coupling 34 is constructed from two inverted U-bolts 36 and 38 set in a base 40. Base 40 is positioned under leaf spring 28 and provides a support for the spring and trailing link 24. The upper surface of trailing link 24 and U-bolts 36 and 38 are used to position conventional axle securing elements 42 and 43. A shock absorber 30 is attached at a pivot 48 to base 40 and at a second pivot 46 in a frame 60 provided for attachment to a chassis frame rail.

Figure 3:
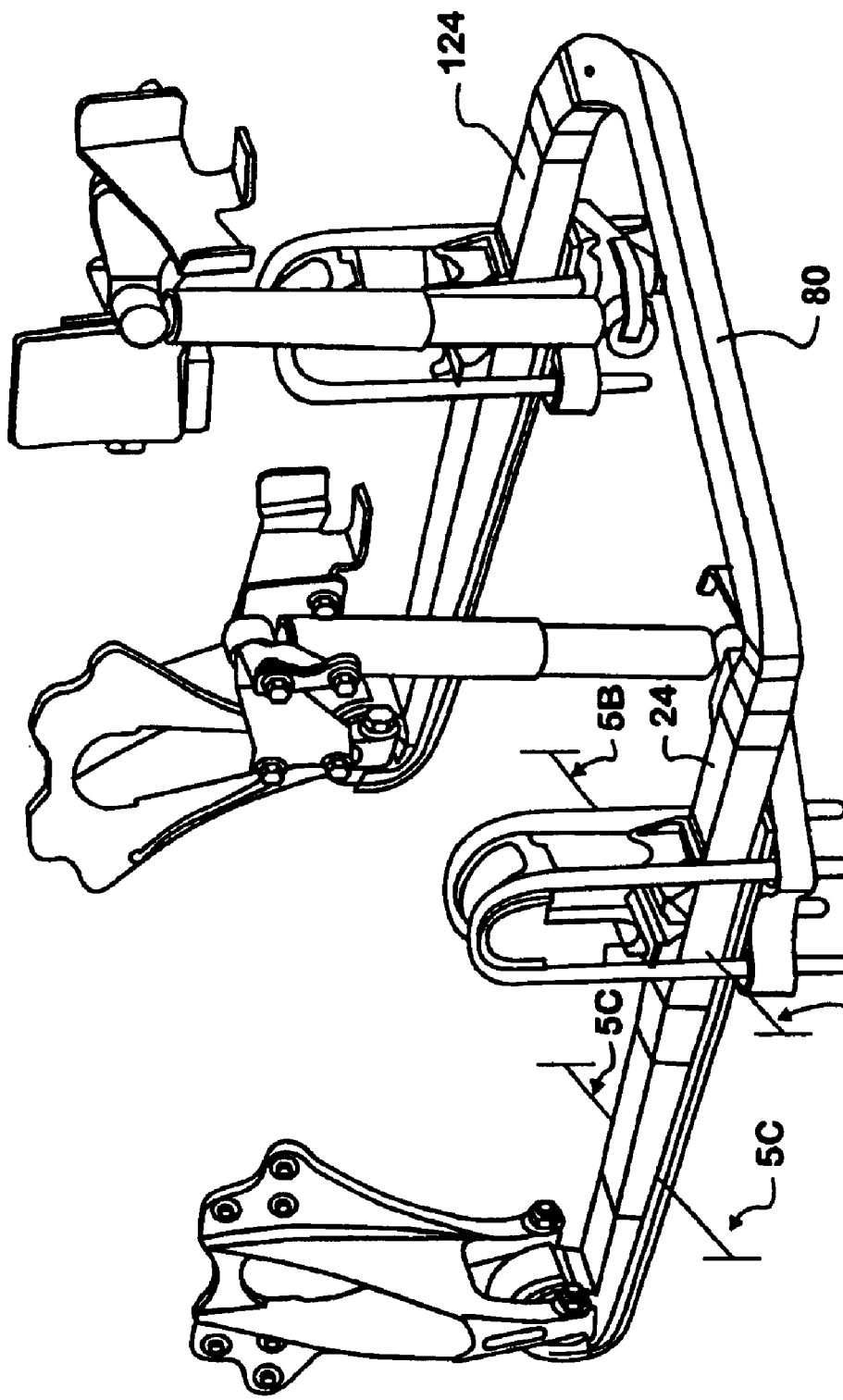
FIG. 3 is a perspective view of another embodiment of the suspension.

In FIG. 3 an optional fabricated sway bar 80 is fitted between open ends 223 (see FIG. 4A) of the left and right side trailing links 24 and 124. Sway bar 80 forms a substantial portion of the turned in portions of the trailing links 24 and 124. Sway bar 80 has a substantially straight middle section and turns forward at the ends to mate with open ends 223 of trailing links 24 and 124.

FIGS. 4A and 4B illustrate a possible external configuration for a representative trailing link member 200 having a rectangular cross sectional shape with constant dimensions. Trailing link assembly 200 comprises a trailing link member 201 and a socket and bushing assembly 202 fitted into one end of trailing link member. Socket and bushing assembly 202 fits a conventional suspension hanger, being attached thereto by the ends of shaft 204. Socket and bushing assembly 202 rotates on shaft 204. Socket and bushing assembly 202 has a shaft 208 sized and shaped to fit snugly into a central passage 210 formed within trailing link member 201. Shaft 208 is secured in position by a pair of nut and bolt fasteners 206. Centrally positioned along beam 201 is an shock absorber attachment plate 212 which is mounted to the beam by a nut and bolt fastener 213. A crush resistant core 220 is positioned within central passage 210 beginning at a point between nut and bolt assembly 213 and socket and bushing assembly 202 and terminating at open ends 223 below bend 222 in canted section 214. Trailing link member 212 has a parallel section 209 which runs parallel to a frame side rail and a canted section 214 aft of the axle. When the link member is mounted on a vehicle the canted section 214 turns inwardly toward the center line of the vehicle. Canted section 214 has a mounting hole 218 for attachment of an air spring. Trailing link member 201 is preferably a heat treated steel tube. The nut and bolt connector assemblies may be replaced by other fastening means such as rivets.

Figure 5A:
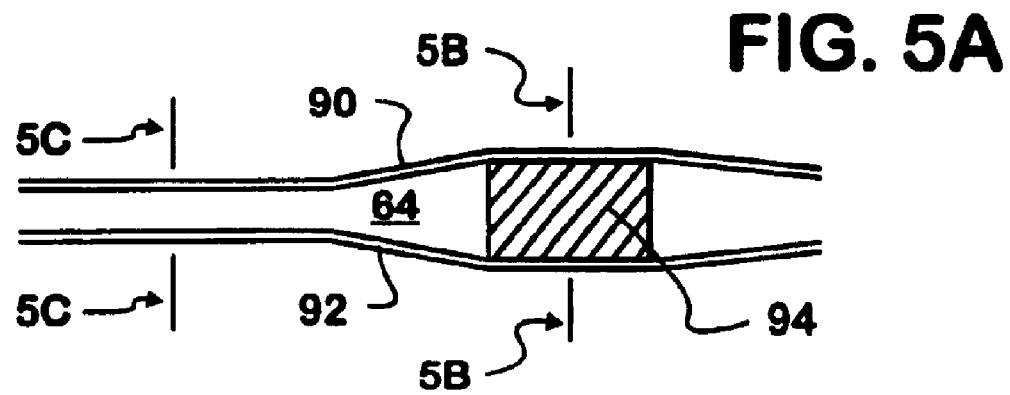
FIGS. 5A, B and C are cross sectional views of a trailing member of the suspension taken along section lines 5A, 5B and 5C in FIG. 3.
Figures 5B, 5C:
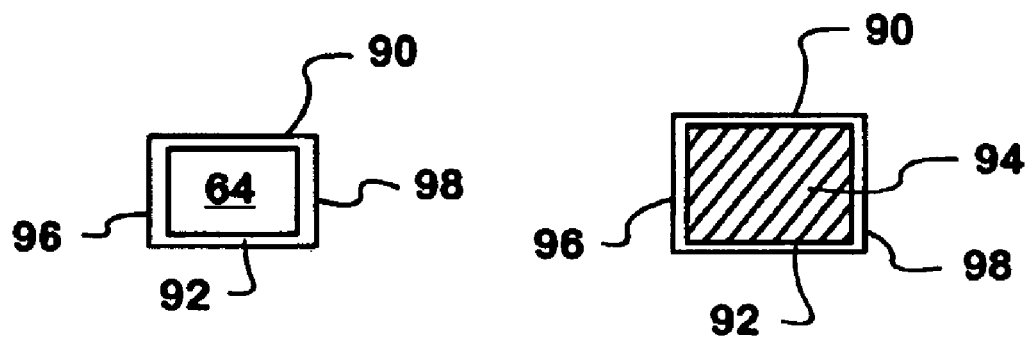

FIGS. 5A–C illustrate interior details of trailing link member 24, and by extension sway bar 80 and trailing link 124. Section 5A is taken lengthwise along a portion of trailing link 24. Sections 5B and 5C are taken across the link at locations spaced along the length of the link and together with Section 5A illustrate the varying vertical spacing between upper wall 90 and lower wall 92. A crush resistant filler 94 is placed in the hollow channel 64 to prevent coupling 34 from crushing the tube on installation. Filler 94 may be a solid block of nylon or steel or other material suitable for reinforcing the side walls 96 and 98 or may be another tube. The link is a rectangular tube which may be fabricated from flat roll stock rather than being forged. This substantially reduces the expenses of manufacture.

The trailing links of the present invention provide axle stabilization for a rear driven axle with an air spring at minimal expense and complexity.

While the invention is shown in only one of its forms, it is not thus limited but is susceptible to various changes and modifications without departing from the spirit and scope of the invention.

What is claimed is:

1. A suspension system for a vehicle having an axle, comprising:

a chassis frame rail;

a hanger depending from the chassis frame rail;

a trailing link depending from the hanger, the trailing link being hollow from end to end and having a central section for location next to the axle and a canted section located aft of the axle turned inwardly to a terminating end under the vehicle;

an auxiliary half leaf spring located under the trailing link between the hanger and the axle;

a main load carrying element mounted between the canted section of the trailing link and the chassis frame rail.

2. A suspension as set forth in claim 1, further comprising:

a crush resistant core in the central section of the trailing arm link.

3. A suspension as set forth in claim 2, the crush resistant core extending into the canted section of the trailing link.

4. A suspension as set forth in claim 3, further comprising:

the main load supporting element being an air spring.

5. A suspension for a vehicle from an axle, the vehicle having left and right side frame rails, the suspension comprising:

left and right side hangers depending from the left and right side frame rails forward of the axle;

hollow tubular left and right side trailing links depending from the left and right side hangers, respectively, the trailing links being coupled to opposite ends of the axle and extending aft of the axle;

left and right side canted sections to the trailing links, located aft of the axle and turned inwardly toward one another in a horizontal plane and having terminating ends;

left and right side couplings attaching opposite ends of the axle to the left and right side trailing links;

left and right side auxiliary leaf springs located below the left and right side trailing links between the hangers and the axle; and main load supporting elements located on the canted sections of the trailing links to carry a load from the left and right side frame rails.

6. A suspension as set forth in claim 5, further comprising:

each trailing link having a filler insert within the hollow tube adjacent the coupling for the trailing link to the axle.

7. A suspension as set forth in claim 6, further comprising:

a sway bar connected between the terminating ends of the left and right side trailing links and forming an extension of the canted sections of the trailing links.

8. A suspension as set forth in claim 6, further comprising:

the main load supporting elements are air springs.

9. A suspension as set forth in claim 7, further comprising:

the main load supporting elements are air springs.

10. A suspension as set forth in claim 9, the left and right side hangers being stamped.

11. A vehicle chassis comprising:

parallel left and right side frame rails;

an axle located under and transverse to the parallel left and right side frame rails;

a hanger depending from each of the respective parallel left and right side frame rails forward from the axle;

left and right side trailing links depending from the hangers for the left side frame rail and right side frame rail, respectively, each trailing link having a straight section parallel to its respective side frame rail and a canted section depending from the straight section located aft of the axle, the canted sections being turned inwardly toward one another and terminating between the left and right side frame rails;

the left and right side trailing links being fabricated from hollow tubes and having crush resistant cores located in the hollow tubes in an area where the trailing link meets the axle;

a shock absorber mounted between the side frame rails and the straight sections of the trailing links; and an air spring mounted between the side frame rails and the canted sections of the trailing links.

12. A vehicle chassis as set forth in claim 11, further comprising: the crush resistant cores extending into the canted sections.

13. A vehicle chassis as set forth in claim 12, further comprising:

an anti-sway bar connected between points of termination of the canted sections as an extension of the canted sections.

14. A vehicle chassis as set forth in claim 11, wherein:

a pivot bushing assembly being attached at a front of each of the trailing links for mounting to the hangers.

* * * * *